(12) United States Patent
Tsukamoto et al.

(10) Patent No.: US 7,953,031 B2
(45) Date of Patent: May 31, 2011

(54) APPARATUS AND METHODS FOR PERFORMING WIRELESS COMMUNICATION AND DETECTION

(75) Inventors: Yasumichi Tsukamoto, Yamato (JP); Takayuki Katoh, Yokohama (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 848 days.

(21) Appl. No.: 11/868,484

(22) Filed: Oct. 6, 2007

(65) Prior Publication Data

US 2008/0089260 A1  Apr. 17, 2008

(30) Foreign Application Priority Data

Oct. 6, 2006  (JP) ................. 2006-274641

(51) Int. Cl.
*G08C 17/00* (2006.01)
*H04B 1/38* (2006.01)
(52) U.S. Cl. ...................... 370/311; 455/574
(58) Field of Classification Search .......... None
See application file for complete search history.

(56) References Cited

U.S. PATENT DOCUMENTS

| | | | |
|---|---|---|---|
| 2004/0125867 A1* | 7/2004 | Tong et al. | 375/148 |
| 2004/0212610 A1* | 10/2004 | Hamlin | 345/211 |
| 2005/0047356 A1* | 3/2005 | Fujii et al. | 370/311 |
| 2006/0128415 A1* | 6/2006 | Horikoshi et al. | 455/522 |
| 2006/0203777 A1* | 9/2006 | Kim et al. | 370/334 |
| 2007/0050473 A1* | 3/2007 | Lee | 709/217 |

FOREIGN PATENT DOCUMENTS

| | | |
|---|---|---|
| JP | 2001-042978 | 2/2001 |
| JP | 2002-176388 | 6/2002 |
| JP | 2002-229684 | 8/2002 |
| JP | 2005-065016 | 3/2005 |
| JP | 2005-191916 | 7/2005 |
| JP | 2002-166242 | 6/2006 |
| JP | 2006-166242 | 6/2006 |

* cited by examiner

*Primary Examiner* — Min Jung
(74) *Attorney, Agent, or Firm* — Ference & Associates LLC

(57) ABSTRACT

Methods and apparatus are provided for enabling an apparatus having a wireless module mounted thereon to detect an access point while saving power consumption in a battery. An apparatus according to the present invention preferably has a system main body, a cover which covers a surface of the system main body, an antenna disposed to the cover, a lid sensor which detects that the cover is opened from the system main body and outputs a lid event signal, a wireless module which is connected with the antenna and detects an access point upon receiving a power, and a power supply module. This power supply module supplies the power to the wireless module in response to output of the lid event signal from the lid sensor. As a result, even if this portable computer is in an OFF state, the power is supplied to the wireless module when the cover is opened, thereby detecting an access point.

18 Claims, 6 Drawing Sheets

| OPERATION MODE | POWER SUPPLY SYSTEM | | | |
|---|---|---|---|---|
| | FIRST POWER SYSTEM | SECOND POWER SYSTEM | THIRD POWER SYSTEM | FOURTH POWER SYSTEM |
| FIRST OFF STATE | ON | OFF | OFF | OFF |
| SECOND OFF STATE | ON | ON | OFF | OFF |
| SUSPEND STATE | ON | ON | ON | OFF |
| ON STATE | ON | ON | ON | ON |
| POWER SUPPLY DESTINATION | POWER CONTROLLER 45 LID SENSOR 47 | EMBEDDED CONTROLLER 41 I/O BRIDGE 25 WIRELESS MODULE 31 LED 35 | MAIN MEMORY 27 | CPU 21 HDD 21 OTHERS |

APPARATUS AND METHODS FOR PERFORMING WIRELESS COMMUNICATION AND DETECTION

CLAIM FOR PRIORITY

This application claims priority from Japanese Application No. 2006-274641 filed on Oct. 6, 2006 and is fully incorporated by reference as if fully set forth herein.

FIELD OF THE INVENTION

The present invention relates to technology for detecting a wireless network in a portable computer, and more particularly to technology for detecting a wireless network by using stabilized electric waves.

BACKGROUND OF THE INVENTION

A portable computer, e.g., a notebook personal computer (PC) or a PDA (personal digital assistant), includes a communication function with respect to various kinds of networks. In a portable computer that is driven by a battery when taken along, saving the power consumption of the battery is one technical problem. As one technique of saving the power consumption in the portable computer, there is a technology of defining a plurality of power supply segments associated with use states to control power consumption. In some of the portable computers, for example, power supply segments, e.g., a system OFF state where an AC adapter is not connected (which will be referred to as a first OFF state hereinafter), a system OFF state where the AC adapter is connected to charge the battery (which will be referred to as a second OFF state hereinafter), a suspend state where the power is supplied only to devices required to store data in a main memory, or a system ON state where the power is supplied to all devices (which will be simply referred to as an ON state hereinafter) are defined, and any one of these segments is selected in accordance with a use state to supply the power to the respective devices constituting the portable computer. Therefore, although a wireless module used for wireless communication is also classified into any power supply segment, wireless communication is not usually carried out in states except the ON state, and hence the power supplied to the wireless module is stopped.

In order to start wireless communication when the portable computer is in the first or second OFF state, a user must operate the wireless module to search for a first connectable access point. To perform this operation, the computer must be turned on and BIOS must terminate an activation routine to start up an operating system (which will be referred to as an OS hereinafter). This takes time, and a CPU or a hard disk drive in which a power consumption is relatively high must be operated. Therefore, the user must carry out a troublesome operation to search for the access point, and a large amount of power is also consumed. Even if the user turns on a power supply of the computer to operate the wireless module in order to effect wireless communication, when an appropriate access point cannot be found, this purpose is not achieved, and hence the operation and the power required to turn on a system are wasted.

As an example of technology for searching for an access point by using a portable computer, there is Horikoshi (Japanese Unexamined Patent Publication No. 2006-166242) which teaches a technology for adding an access detection button to a notebook PC in which power is not supplied to an access point detection circuit when a power supply is in an OFF or suspend state, and supplying power to the access point detection circuit only when the access detection button is pushed, thereby performing scanning.

Further, as an example of technology for controlling power consumption in a wireless communication terminal, there is Takeshi (Japanese Unexamined Patent Publication No. 2002-176388) which teaches a technology for detecting that a display section case of a notebook PC is closed by using a switch to suppress an electric wave emitting operation of a wireless device or Shigeki (Japanese Unexamined Patent Publication No. 2002-229684) which teaches a technology for detecting a closed state of a lid of a portable mail terminal to stop the supply of power, thereby stopping reception of mail.

As taught in Horikoshi (Japanese Unexamined Patent Publication No. 2006-166242) since the power is supplied to the access point detection circuit only when an access point is to be scanned, the power can be economized. However, a case of the portable computer is small, and assuring a space where the button is newly provided is difficult, which results in an increase in cost. Furthermore, an antenna of the portable computer is disposed at a periphery of a display section integrated with a lid, and the antenna is usually designed in such a manner that a reception sensitivity for electric waves becomes most excellent when the lid is opened from a system main body and there is no interference from the system main body. When the button is provided to supply the power to the access point detection circuit, the lid is usually closed to search for an access point in a state where the reception sensitivity for electric waves is low. Therefore, even if the access point can be actually detected by opening the lid, detection is impossible in some cases.

While the above systems and methods allow for detecting wireless access points, a need has arisen for detecting wireless access points while overcoming the shortcomings discussed above.

SUMMARY OF THE INVENTION

There are broadly contemplated herein, in accordance with at least one presently preferred embodiment of the present invention, new methods and apparatus for detecting a wireless access point while conserving power.

One aspect of the present invention provides an apparatus comprising: a system main body; a power supply; an antenna; a sensor arrangement that detects an optimal position for the antenna to sense electric waves and produces an output signal upon detecting said optimal position; a wireless module being in operable connection with the main body, the antenna, and the power supply; and a power supply module that controls the power supply to the wireless module, supplying power to the wireless module upon receiving said output signal.

Another aspect of the present invention provides an apparatus comprising: an arrangement that provides a first power supply mode corresponding to a first use state; an arrangement that provides a second power supply mode corresponding to a second use state, wherein the second power supply mode has a wider power supply range than the first power supply mode; a system main body; a power supply; an antenna; a sensor arrangement that detects an optimal position for the antenna to sense electric waves and produces an output signal upon detecting said optimal position; a wireless module being in operable connection with the main body, the antenna, and the power supply, wherein the wireless module receives power in the second power supply mode to detect an access point; and a power supply module that controls the power supply to the wireless module and is switchable between the first power supply mode and the second power supply mode, wherein the power supply module is switched from the first power supply mode to the second power supply mode in order to supply power to the wireless module in response to the output signal.

Another aspect of the present invention provides a method comprising: stopping supply of power to a wireless module associated with an apparatus; outputting an output signal from a sensor in response to detecting an optimal position for an antenna to sense electric waves; supplying power to the wireless module in response to the output signal; and detecting an access point by the wireless module receiving the power in response to the output signal.

Another aspect of the present invention provides a program storage device readable by machine, tangibly embodying a program of instructions executable by the machine to perform method steps, the method steps comprising the steps of: stopping supply of a power to a wireless module associated with an apparatus; outputting an output signal from a sensor in response to detecting an optimal position for an antenna to sense electric waves; supplying power to the wireless module in response to the output signal; and detecting an access point by the wireless module receiving power in response to the output signal.

DETAILED DESCRIPTION OF THE INVENTION

Figure 1:
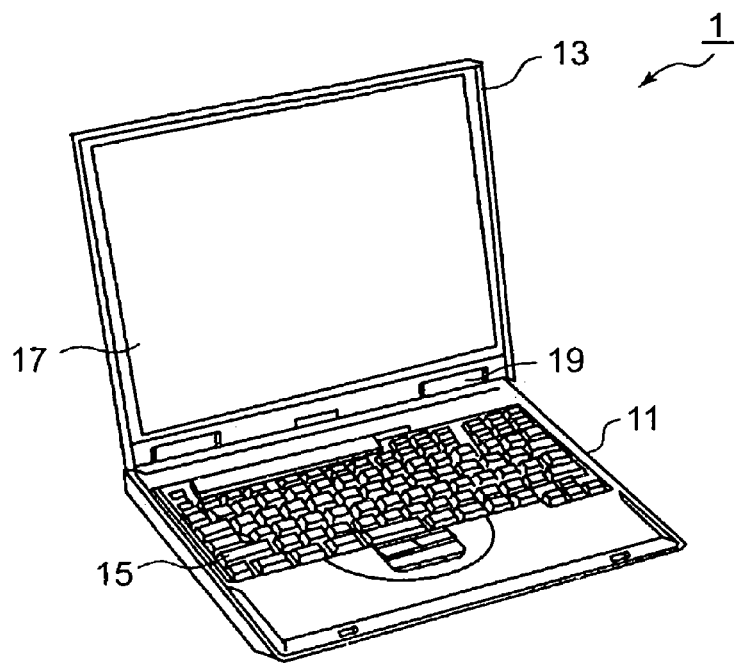
FIG. 1 is an external view of a notebook PC according to an embodiment of the present invention.

For a better understanding of the present invention, together with other and further features and advantages thereof, reference is made to the following description, taken in conjunction with the accompanying figures, and the scope of the invention will be pointed out in the appended claims.

It will be readily understood that the components of the present invention, as generally described and illustrated in the figures herein, may be arranged and designed in a wide variety of different configurations. Thus, the following more detailed description of the embodiments of the apparatus and methods of the present invention, as represented in the figures, is not intended to limit the scope of the invention claimed, but is merely representative of selected embodiments of the invention.

Reference throughout this specification to "one embodiment" or "an embodiment" (or the like) means that a particular feature, structure, or characteristic described in connection with the embodiment is included in at least one embodiment of the present invention. Thus, appearances of the phrases "in one embodiment" or "in an embodiment" (or the like) in various places throughout this specification are not necessarily referring to the same embodiment.

Furthermore, the described features, structures, or characteristics may be combined in any suitable manner in one or more embodiments. In the following description, numerous specific details are given to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will best be understood by reference to the figures, wherein like parts are designated by like numerals or other labels throughout. The following description is intended only by way of example, and simply illustrates certain selected embodiments of devices, systems, and processes that are consistent with the invention as claimed.

The disclosure will now provide an overview of the invention before providing a more detailed description of the invention.

One embodiment of the invention provides a portable computer which can detect an access point while saving power consumption of a battery, and has a wireless module mounted thereon. The portable computer can detect an access point without adding new hardware, e.g., an external switch. Additionally, the portable computer can detect an access point in a state where a reception sensitivity for electric waves is excellent. Other embodiments of the present invention provide a method of detecting an access point for wireless communication in such a portable computer, a computer program executed by the portable computer, and a recording medium having the computer program stored thereon.

The portable computer according to one embodiment of the present invention can perform wireless communication, and has a system main body, a cover which covers a surface of the system main body, an antenna disposed to the cover, a lid sensor which detects that the cover is opened from the system main body to output a lid event signal, a wireless module which is connected with the antenna and receives a power to detect an access point, and a power supply module. In this power supply module, supply of the power is stopped in a state where the surface of the system main body is covered with the cover. However, the power is supplied to the wireless module when the lid sensor operates and outputs the lid event signal. As a result, in this portable computer, the power is not supplied to the wireless module when the surface of the system main body is covered with the cover, and the power is not supplied to the wireless module to detect the access point until the cover is opened, thereby saving the power consumption. Since the access point is detected when the cover is opened and a sensitivity of the antenna is excellent, this detection can be accurately carried out as compared with a state where the cover is closed. Detection of the access point is started by the lid sensor provided in the portable computer on the standard scale, and hence a button does not have to be added.

Moreover, this computer further has a power supply control section, and this power supply control section can be configured to receive the power from the power supply module in a state where the surface of the system main body is covered with the cover and to control the power supply module in such a manner that the power is supplied to the wireless module in response to output of the lid event signal from the lid sensor. Additionally, when the surface of the system main body is covered with the cover and the power supply module stops supply of the power to the wireless module, this portable computer can operate in a battery mode and stay in a system OFF state (a first OFF state).

At the same time, this computer further has a timer which starts an operation in response to the lid event signal output from the lid sensor. When this timer reaches a set time, the power supply module stops supply of the power fed to the wireless module; hence, wastefully forgetting to turn off the power supply is eliminated with respect to this power supply, which is desirable. Further, notifying a user of an access point detection result can be carried out by using any suitable indicator, e.g., turning on or blinking an LED (light emitting diode).

In another embodiment, the portable computer according to the present invention includes first and second power supply modes. The first and second power supply modes respectively correspond to first and second use states, and the second power supply mode has a wider power supply range than the first power supply mode. This computer includes a system main body, a cover which covers a surface of the system main body, an antenna disposed to the cover, a lid sensor which detects that the cover is opened from the system main body to output a lid event signal, a wireless module which is connected with the antenna and receives the power in the second power supply mode to detect an access point, and a power supply module. This power supply module is switchable between the first and second power supply modes, and supplies the power to the wireless module when switched to the second power supply mode in response to the lid event signal.

The first and second power supply modes explained herein can be respectively associated with a system OFF state (a first OFF state) in a battery mode and a system OFF state (a second OFF state) in a commercial power supply mode. Furthermore, in the second power supply mode, since a main memory which receives the power in a suspend state does not have to be used, it is desirable for the power supply range of this mode to be narrower than a power supply mode at the time of suspend.

Moreover, this computer further has a storage section and a power supply control circuit, and this storage section operates upon receiving the power in the first power supply mode and stores the lid event signal. The power supply control circuit can be configured to switch the power supply module from the first power supply mode to the second power supply mode in response to the lid event signal. Additionally, this computer further has an event processing circuit which operates upon receiving the power in the second power supply mode, and this event processing circuit can be configured to read the lid event signal stored in the storage section and thereby output a scan signal to the wireless module, thus detecting the access point. As a result, the wireless module can determine an event which allows supply of the power to the wireless module itself and to detect the access point only when the cover is opened to supply the power.

The event processing circuit can include an I/O (Input/Output) bridge connected with the wireless module. Further, this event processing circuit includes a timer which starts an operation in response to the lid event signal. When this timer reaches a set time, the event processing circuit outputs to the power supply control circuit a signal for switching the power supply module to the first power supply mode, and hence wastefully forgetting to turn off the power supply can be likewise eliminated, which is desirable. Furthermore, when a keyboard controller is configured to receive the power in the second power supply mode, the event processing section can detect the access point in response to an operation (e.g., pushing a specific hot key or function key) of a keyboard connected with the keyboard controller. In this case, it is desirable to notify a user of an access point detection result by using an indicator which operates upon receiving the power in the second power supply mode.

In another embodiment, the present invention can also provide a method of detecting an access point for wireless communication in a portable computer having an antenna disposed to a cover which covers a system main body and a wireless module connected with the antenna. In this case, this portable computer executes a step of stopping supply of a power to a wireless module, a step of outputting a lid event signal to a lid sensor in response to opening of the cover, a step of supplying the power to the wireless module in response to the lid event signal, and a step of detecting an access point by the wireless module receiving the power in response to the lid event signal. Additionally, the step of stopping supply of the power can include a step of operating the portable computer in a battery mode to enter a system OFF state. Further, a step of measuring elapse of a predetermined time after the lid event signal is output and a step of stopping supply of the power to the wireless module in response to elapse of the predetermined time can also be included. Further, the present invention can also provide a computer program which executes the respective steps described herein and a storage medium recording this program therein.

In yet another embodiment, the present invention can provide the portable computer which can detect an access point while saving a power consumption of the battery and has the wireless module mounted thereon. The present invention can also provide the portable computer which can detect the access point without adding new hardware, e.g., an external switch. Moreover, the present invention can provide the portable computer which can detect the access point in a state where a reception sensitivity for electric waves is excellent. Additionally, the present invention can provide the method of detecting the access point for wireless communication in such a portable computer, a computer program executed by the portable computer, and a recording medium having the computer program stored therein.

Referring now to the figures, a preferred embodiment according to the present invention will now be described in detail. While the following detailed description focuses on the invention as embodied in a notebook computer, it will be readily understood by one having ordinary skill in the relevant art that the present invention may be embodied in any like device where detection of wireless access points while conserving power is desirable.

FIG. 1 is an external view of a notebook personal computer (which will be referred to as a notebook PC hereinafter) 1 according to an embodiment of the present invention. The notebook PC 1 includes a main-body-side case 11 and a display-side case 13 both having a substantially rectangular parallelepiped shape. The main-body-side case 11 includes an input section 15 provided with a keyboard and a pointing device, and the display-side case 13 includes a display 17. Further, the main-body-side case 11 and the display-side case 13 are coupled with each other at respective ends thereof by coupling portions 19, and they can swivel in a direction along which these cases are opened/closed. When both the main-body-side case 11 and the display-side case 13 are closed, the input section 15 and the display 17 are hidden inside and covered. Furthermore, an antenna which is used to connect with a wireless network (e.g., a wireless LAN) is included at an outer edge of the display-side case 13. A state where both the main-body-side case 11 and the display-side case 13 are closed will be simply referred to as a state where the notebook PC 1 is closed hereinafter. In contrast, a state where both the main-body-side case 11 and the display-side case 13 are opened will be simply referred to as a state where the notebook PC 1 is opened.

Figure 2:
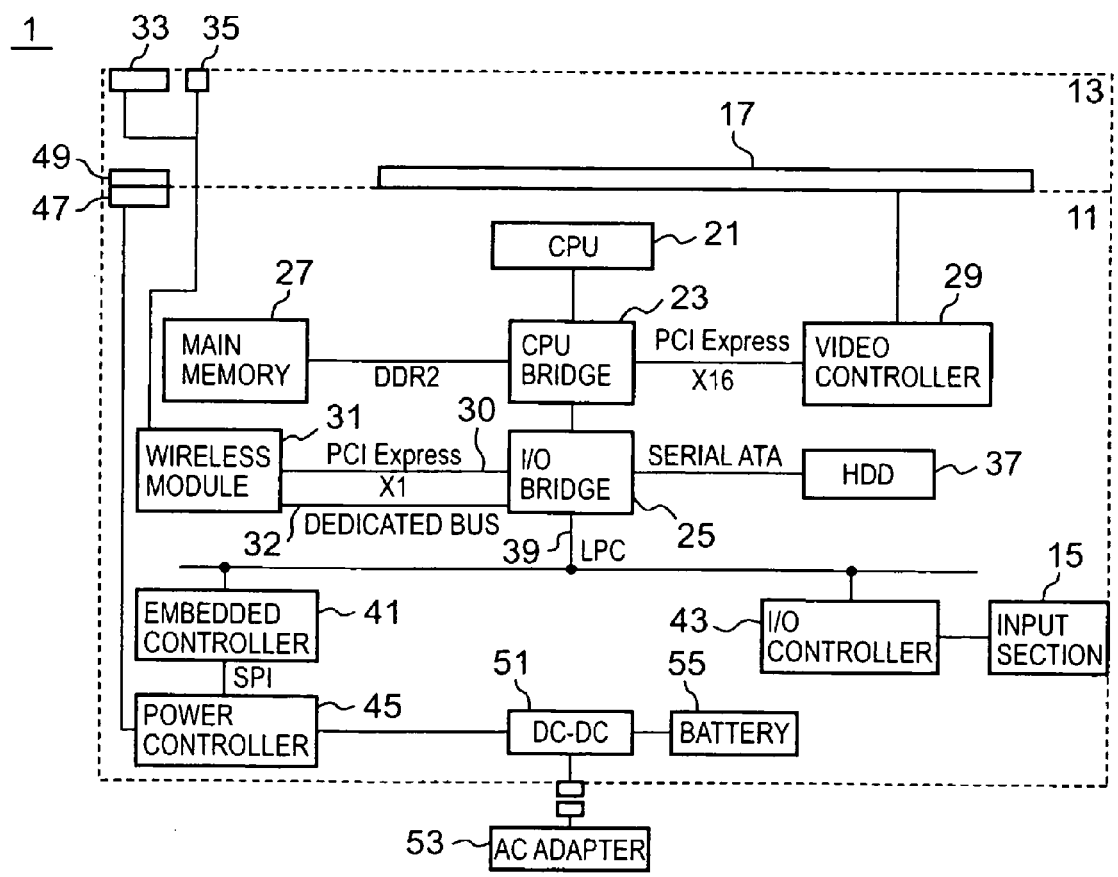
FIG. 2 is a schematic view showing a hardware structure in the notebook PC according to an embodiment of the present invention.

FIG. 2 is a schematic view showing a structure of hardware built in the notebook PC 1. A CPU 21 is a central processing unit that has a central function with respect to the notebook PC, and executes an OS (operating system), a BIOS (basic input/output system), a device driver, an application program, and others. The CPU 21 is connected with a chip set configured with a CPU bridge 23 or an I/O bridge 25 at the center through various buses, and controls each device constituting the notebook PC 1. The CPU bridge 23 includes a memory controller function of controlling an access operation with respect to a main memory 27, a data buffer function of absorbing a difference in data transfer rate between the CPU 21 and the other devices, and others. The main memory 27 is a writable memory which is connected with the CPU 21 via a DDR (Double Data Rate) 2 bus and utilized as a read area for the program executed by the CPU 21 or a work area in which processing data is written. A video controller 29 is connected with the CPU 21 via a PCI Express X 16 bus, has a video chip and a VRAM (volatile random access memory) (which are not shown), generates and writes in the VRAM an image to be drawn upon receiving a drawing command from the CPU 21, and transmits the image read from the VRAM to the display 17 as drawing data.

A wireless module 31 is compatible with multiinput/multioutput (MIMO) wireless communication conforming to, e.g., IEEE802.11n, connected with the I/O bridge 25 via a PCI Express X 1 bus 30 and a separately provided access point detection dedicated bus 32, and performs data communication with the wireless network via an antenna 33. As different from the PCI Express X 1 bus 30 which operates in an ON state alone, the access point detection dedicated bus 32 operates in a second OFF state. Furthermore, the wireless module 31 has a function of detecting a connectable access point upon receiving an access point detection command transmitted from the I/O bridge 25 through the access point detection dedicated bus 32, and can inform a user of a detection result by turning on an LED 35 (particulars will be explained later). It is to be noted that the antenna 33 and the LED 35 are disposed to the display-side case 13. Since the antenna 33 is disposed to the display-side case 13, an electric wave interference from the main-body-side 11 is reduced in the state where the notebook PC 1 is opened, and a sensitivity is increased. Moreover, the I/O bridge 25 also includes functions as a serial ATA interface and a USB interface (not shown), and is connected with a hard disk drive (HDD) 37, an optical drive (not shown), and others through a serial ATA. Additionally, the I/O bridge 25 is connected with a legacy device which is a device conforming to an old standard conventionally adopted in the notebook PC or a device which does not require high-speed data transfer through a PCI bus (not shown) or an LPC bus 39.

The LPC bus 39 is connected with an embedded controller 41, an I/O controller 43, a BIOS-ROM (BIOS-Read Only Memory, not shown) storing the BIOS used for activation of the system, and others. The embedded controller 41 is a microcomputer constituted of, e.g., a CPU of 8 to 16 bits, a ROM, or a RAM (random access memory), and includes an A/D (analog/digital) input terminal, a D/A output terminal, a timer, and a digital input/output terminal for a plurality of channels. The embedded controller 41 is connected with a cooling fan (not shown), a temperature sensor (not shown), a power controller 45 which controls a power supply device, and others through these input/output terminals, and can execute a program for management of an operation environment in the PC independently from the CPU 21. The program according to the present invention is stored in the ROM of the embedded controller 41 as a part of a system activation management program, and executed by the CPU of the embedded controller 41 (particulars will be explained later). The I/O controller 43 is connected with the input section 15 formed of a keyboard and/or a mouse.

The embedded controller 41 is connected with the power controller 45 via an SPI (Serial Peripheral Interface) as a dedicated bus. The power controller 45 controls a DC-DC converter 51 based on power supply segments defined in accordance with operation modes (particulars will be explained later). The power controller 45 is connected with a lid sensor 47 which detects opening/closing of the main-body-side case 11 and the display-side case 13, a DC-DC converter 51, and others. A permanent magnet 49 is embedded in the display-side case 13, and the permanent magnet 49 moves closer to the lid sensor 47 arranged on the main-body-side case 11 side in the state where the notebook PC 1 is closed. When the notebook PC 1 is opened, the permanent magnet 49 moves away from the lid sensor 47. The lid sensor 47 can detect whether the permanent magnet 49 is close to the lid sensor 47 by sensing a magnetic force from the permanent magnet 49, and can be aware of whether the notebook PC 1 is closed or opened. In this structure, since both the lid sensor 47 the permanent magnet 49 are not exposed to the outside of the case and a contact point or a movable portion is not present, there is an advantage that a failure rarely occurs as compared with, e.g., a mechanical switch.

The DC-DC converter 51 converts a direct-current power supplied from an AC adapter 53 and a battery 55 into a plurality of voltages required to operate the notebook PC 1, and supplies the powers to the respective device based on the power supply segments defined in accordance with the operation modes. The AC adapter 53 is detachable from/attachable to the notebook PC 1. Additionally, when the AC adapter 53 is connected with the notebook PC 1, the DC-DC converter 51 controls charging the battery 55.

It is to be noted that FIGS. 1 and 2 show the primary hardware structure and connection relationships concerning this embodiment in the simplified forms in order to explain this embodiment. Besides the devices in the above explanation, many devices are used to configure the notebook PC 1, but they are well known to persons skilled in the art, and hence a detailed explanation will be omitted here. Configuring a plurality of blocks in the drawing as one integrated circuit or device or dividing one block into a plurality of integrated circuits or devices to be configured is also included in the scope of the present invention as long as persons skilled in the art can arbitrarily select such structures. Further, types of the buses or the interfaces connecting the respective devices with each other are just examples, and other connections are included in the scope of the present invention as long as persons skilled in the part can arbitrarily select such connections.

Figures 3, 4:
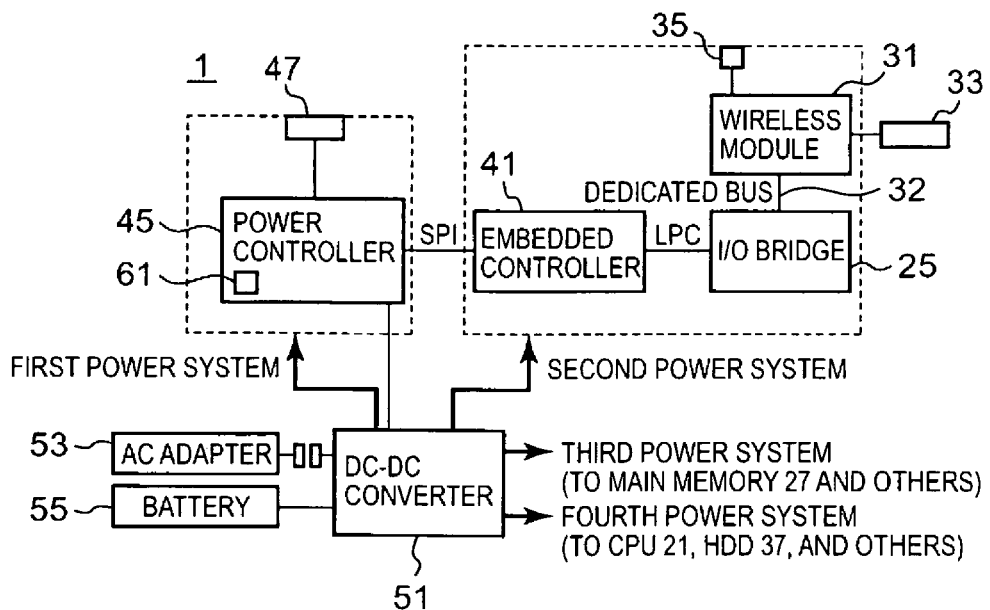
FIG. 3 is a table showing four power supply systems and power supply ranges based on operation modes in a notebook PC according to an embodiment of the present invention.
FIG. 4 is a schematic block diagram showing a primary hardware structure constituting a notebook PC according to an embodiment of the present invention in more detail.

FIG. 3 is a table showing four power supply systems and power supply ranges based on the operation modes. FIG. 4 is a schematic block diagram showing the primary hardware structure constituting this embodiment in more detail. Here, as the operation modes of the notebook PC 1, four states, i.e., the first OFF state, a second OFF state, a suspend state, and an ON state are defined. The DC-DC converter 51 has the four systems, i.e., the first to fourth power supply systems to supply the power to a necessary device based on the power supply segments defined in accordance with these four operation modes. The first power system is a system which receives the power in all the operation modes. To this system are connected the power controller 45 and the lid sensor 47. The power is supplied to a device connected with the first power system even in the first OFF state. The first OFF state is a state where the AC adapter is not connected and a system power supply is off, and it is defined to provide the narrowest power supply range in the notebook PC 1. When the power controller 45 is connected with the first power system, it can control the DC-DC converter 51 to turn on the power supply at the timing where a power supply switch of the notebook PC 1 is turned on in a state where the power supply is off without connecting the AC adapter.

The second power system is a system which receives the power in the three higher-level operation modes except the first OFF state. To this system are connected the embedded controller 41, the I/O bridge 25, the wireless module 31, and the LED 35. The power is supplied to the devices connected with the second power system even in the second OFF state. The second OFF state is a state where the AC adapter is connected and the system power supply is off. Although the power must be supplied to the second power system to operate the wireless module 31, the operation mode must be at least the second OFF state in order to realize this supply. In the notebook PC according to this embodiment, a power consumption in the first OFF state is suppressed by supplying the power to the wireless module 31 in the operation modes which are higher than the second OFF state.

The third power system is a system to which the power is supplied in the suspend state and the ON state. To this system are connected the main memory 27 which must hold stored contents even in the suspend state and a device (not shown) required to maintain stored contents in the memory 27. The fourth power system is a system to which the power is supplied in the ON state only. To this system are connected the CPU 21, the HDD 37, and a large part of the other devices.

The lid sensor 47 can be aware of whether the notebook PDC 1 is closed or opened by sensing a magnetic force of the permanent magnet 49, but an operation of sensing the power requires supply of the power. In a conventional notebook PC, the lid sensor is used to switch the suspend state and the ON state to/from each other, and hence it is good enough for the lid sensor to be connected to the third power system to which the power is supplied in the suspend state and the ON state. However, in this embodiment, since the lid sensor 47 must detect the opened/closed state of the notebook PC 1 in the first and second OFF states, the lid sensor 47 is connected with the first power system and transmits a signal informing an opening/closing event to the power controller 45.

The power controller 45 connected with the first power system stores information concerning the power supply systems associated with the operation modes in advance, and controls the DC-DC converter 51 so that the power can be supplied to the supply system associated with each operation mode. Further, the power controller 45 has a register 61 which records contents of an operation mode changing event therein when this event occurs.

The embedded controller 41 connected with the second power system is connected with the power controller 45 through an SPI as a dedicated bus so that it can read contents in the register 61. For example, when the first OFF state is shifted to the second OFF state, or when the first OFF state is shifted to the ON state, the power is supplied to the embedded controller 41 which has not received the power. The embedded controller 41 which has started an operation upon receiving the power can read contents in the register 61 via the SPI to be aware of an event which has enabled the embedded controller 41 to start the operation. Furthermore, the embedded controller 41 can transmit an access point detection command to the wireless module 31 via the I/O bridge 25 connected through the LPC bus. It is to be noted that the embedded controller 41 controls the DC-DC converter 51 based on, e.g., charging the battery, but direction connections other than the power system (the second power system) between the embedded controller 41 and the DC-DC converter 51 are omitted in FIG. 4.

It is good enough for the I/O bridge 25 and the wireless module 31 to be connected with the fourth power system when they are used in the ON state. However, in this embodiment, they are connected to the second power system to detect an access point with a reduced power consumption of the notebook PC 1. The I/O bridge 25 is connected with the wireless module 31 through a dedicated bus. The I/O bridge 25 transmits the access point detection command from the embedded controller 41 through the access point detection dedicated bus 32. The wireless module 31 which has received the access point detection command detects a connectable access point through the antenna 33, and turns on the LED 35 to inform a user if detection is successful. The LED 35 is connected with the second power system, and the wireless module 31 controls to turn on or turn off the LED 35.

Figure 5:
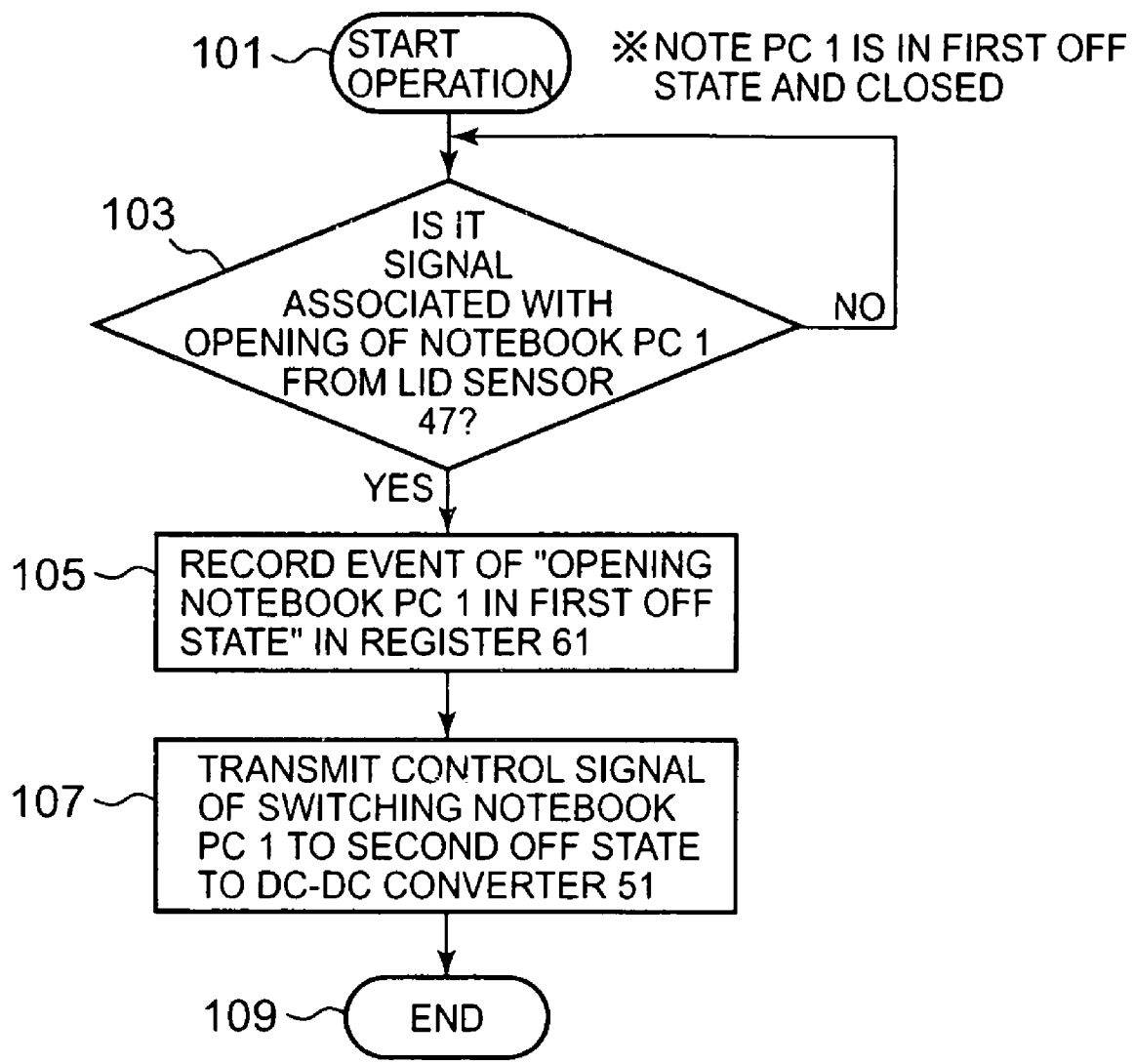
FIG. 5 is a flowchart showing processing executed by a power controller in a notebook PC according to an embodiment of the present invention.

FIG. 5 is a flowchart showing processing executed by the power controller 45 when the notebook PC 1 according to this embodiment is opened. This processing is started (at block 101) from a state where the notebook PC 1 is in the first OFF state and closed. In this state, the AC adapter 53 is not connected with the notebook PC 1, and the power is supplied to the DC-DC converter 51 from the battery 55 alone. Moreover, the DC-DC converter 51 supplies the power to the power controller 45 and the lid sensor 47 alone. Here, when the notebook PC 1 is opened, the lid sensor 47 detects the opened state and transmits a signal corresponding to the opened state of the notebook PC 1 to the power controller 45 (at block 103). In response to this signal, the power controller 45 records in the register 61 data corresponding to a notebook PC 1 opening event in the first OFF state (at block 105). Then, the power controller 45 transmits a control signal to the DC-DC converter 51 to switch the notebook PC 1 from the first OFF state to the second OFF state (at block 107). The DC-DC converter 51, which has received the control signal, newly starts supply of the power to the second power system. The embedded controller 41, the I/O bridge 25, the wireless module 31, and the LED 35 connected with the second power system thereby now start receiving the power. With these operations, the processing executed on the power controller 45 side is terminated (at block 109).

Figure 6:
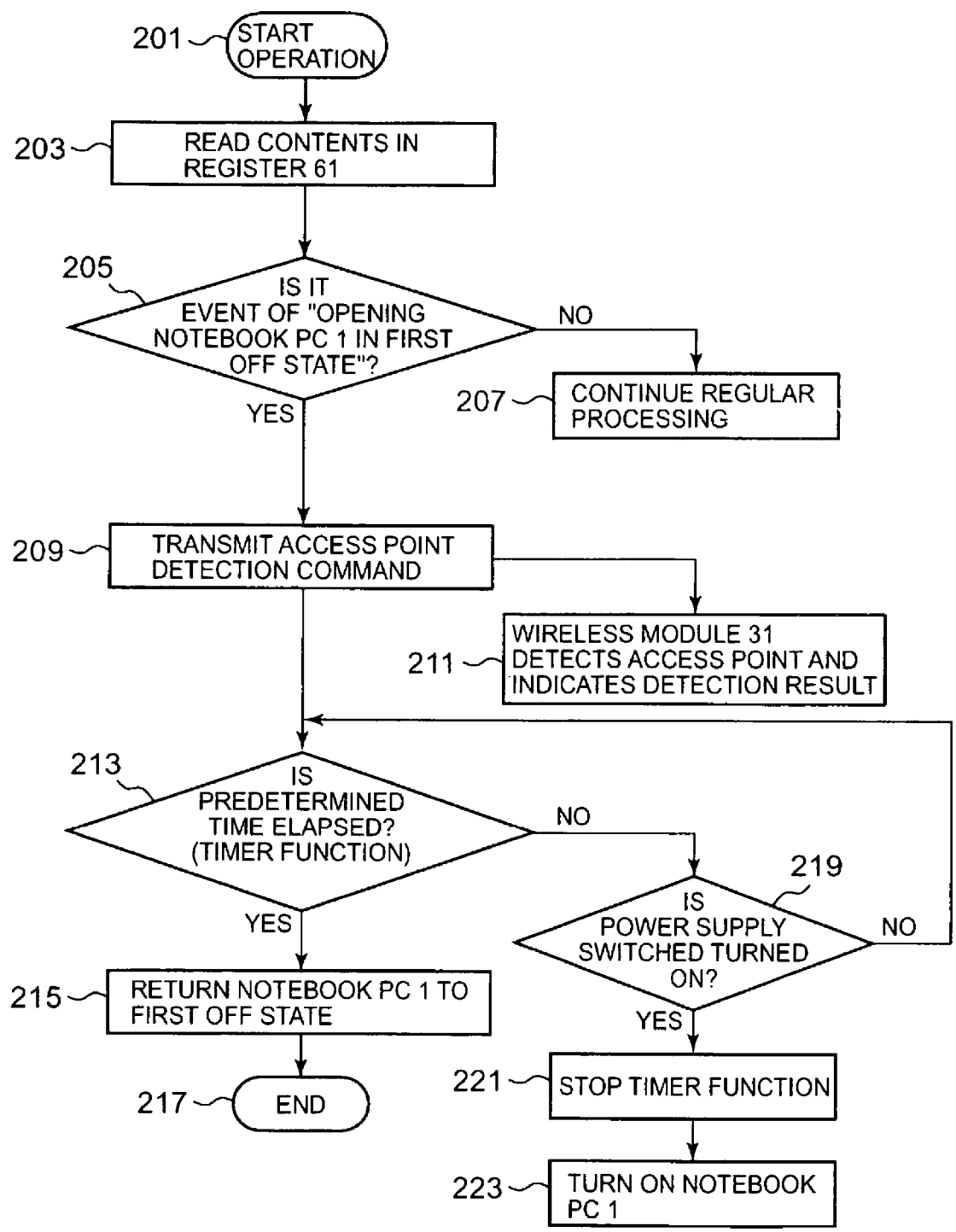
FIG. 6 is a flowchart showing processing executed by an embedded controller in a notebook PC according to an embodiment of the present invention.

FIG. 6 is a flowchart showing processing of the system activation management program executed by the embedded controller 41. When supply of the power to the embedded controller 41 begins, the system activation management program starts an operation in the embedded controller 41 (at block 201). In this state, the embedded controller 41 does not recognize an event enabling the embedded controller 41 to start the operation. Thus, the system activation management program reads contents in the register 61 of the power controller 45 through the SPI (at block 203), and judges the read contents (at block 205). If the contents in the register 61 correspond to an event of opening the notebook PC 1 in the first OFF state, the processing advances to a block 209 and subsequent blocks. If the contents correspond to any other event, e.g., regular power-on event of turning on the power supply switch (not shown) of the notebook PC 1 to enter the ON state, processing concerning the regular power-on event and the like is continuously carried out without detecting an access point (at block 207, subsequent processing is a known technology, thereby omitting a description in the flowchart and an explanation in this specification).

The system activation management program which has recognized the event of opening the notebook PC 1 in the first OFF state transmits an access point detection command to the I/O bridge 25 to detect an access point (at block 209). The access point detection command is transmitted from the I/O bridge 25 to the wireless module 31. In response to the access point detection command, detection of an access point and processing of indicating a detection result by the LED 35 are executed in the wireless module 31 (at block 211). On the other hand, the system activation management program which has transmitted the access point detection command activates a timer function for measuring elapse of a predetermined time from this moment (at block 213). The "predetermined time" measured by this timer function is set to a time that is sufficient for the wireless module 31 to perform detection of the access point, indicate the detection result, and for a user to confirm the indicated result.

When the timer function finishes measuring the predetermined time, the embedded controller 41 transmits a control signal required to return the notebook PC 1 to the first OFF state from the second OFF state to the power controller 45 (at block 215). In response to this signal, the power controller 45 transmits a control signal to the DC-DC converter 51 to stop supply of the power to the second power system. Then, the operation of the system activation management program is terminated (at block 217). However, a user who has confirmed detection of the access point based on lighting of the LED 35 by the processing in block 211 while the timer function is being activated in block 213 can immediately turn on the power supply switch (at block 219). When the power supply switch of the notebook PC 1 is turned on, the timer function in block 213 is stopped (at block 221), and the notebook PC 1 enters the ON state (at block 223). In this case, since detection of the access point has been already confirmed, the notebook PC 1 can be immediately connected with a network.

Further, even though a user wants to connect the notebook PC 1 to the network and use it, if this user has confirmed that detection of the access point failed based on non-lighting of the LED 35 within a predetermined time, he/she can close the notebook PC 1, as it is not on, and move it to another place. In this case, the only operation the user must execute is opening the notebook PC 1, and again closing it, until she/she confirms that the access point is not detected. Furthermore, the user can confirm that the access point is not detected without activating the OS and without operating the CPU or the HDD. Then, the notebook PC 1 returns to the first OFF state when the timer function finishes measuring the predetermined time, and hence a time and a power consumption required for this operation are small.

Figure 7:
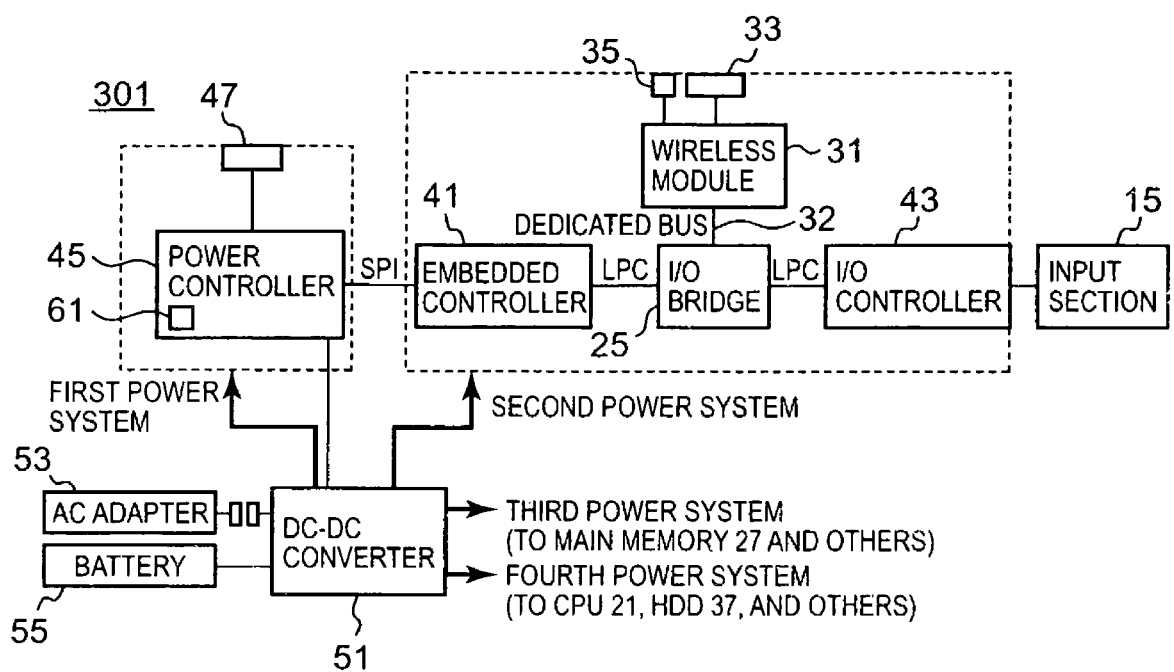
FIG. 7 is a schematic block diagram showing a primary hardware structure constituting a notebook PC according to an embodiment of the present invention.

FIG. 7 is a schematic block diagram showing a primary hardware structure constituting a notebook PC 301 according to another embodiment of the present invention. When an active scan scheme is adopted or authentication is carried out at an access point, an antenna of the notebook PC emits electric waves. The foregoing embodiment has a structure where an access point is automatically detected when the notebook PC 1 in the first OFF state is opened. However, according to this structure, when a user is in a place where utilization of wireless communication is prohibited or undesirable, e.g., a hospital or an aircraft, the antenna 33 emits electric waves by just opening the notebook PC 1. To solve such a problem, of first to fourth power supply systems, the first power system is connected with a power controller 45 and a lid sensor 47, and the second power system is connected with an embedded controller 41, an I/O bridge 25, a wireless module 31, an LED 35, and an I/O controller 43. In regard to the I/O controller 43, detecting input of a specific key (which will be explained later) to an input section 15 corresponding to an access point detection command from a user can suffice. Therefore, in the second power system, the power is supplied to a part required to recognize input of the specific key in the I/O controller 43, and supply of the power to other parts in the I/O controller 43 may be stopped. Since the notebook PC 301 is the same as the notebook PC 1 in regard to the other hardware, the same reference numerals will be given, and an explanation thereof is omitted. Processing executed by the power controller 45 when the notebook PC 1 is opened is the same as that in the flowchart of FIG. 5, and an explanation thereof is omitted.

Figure 8:
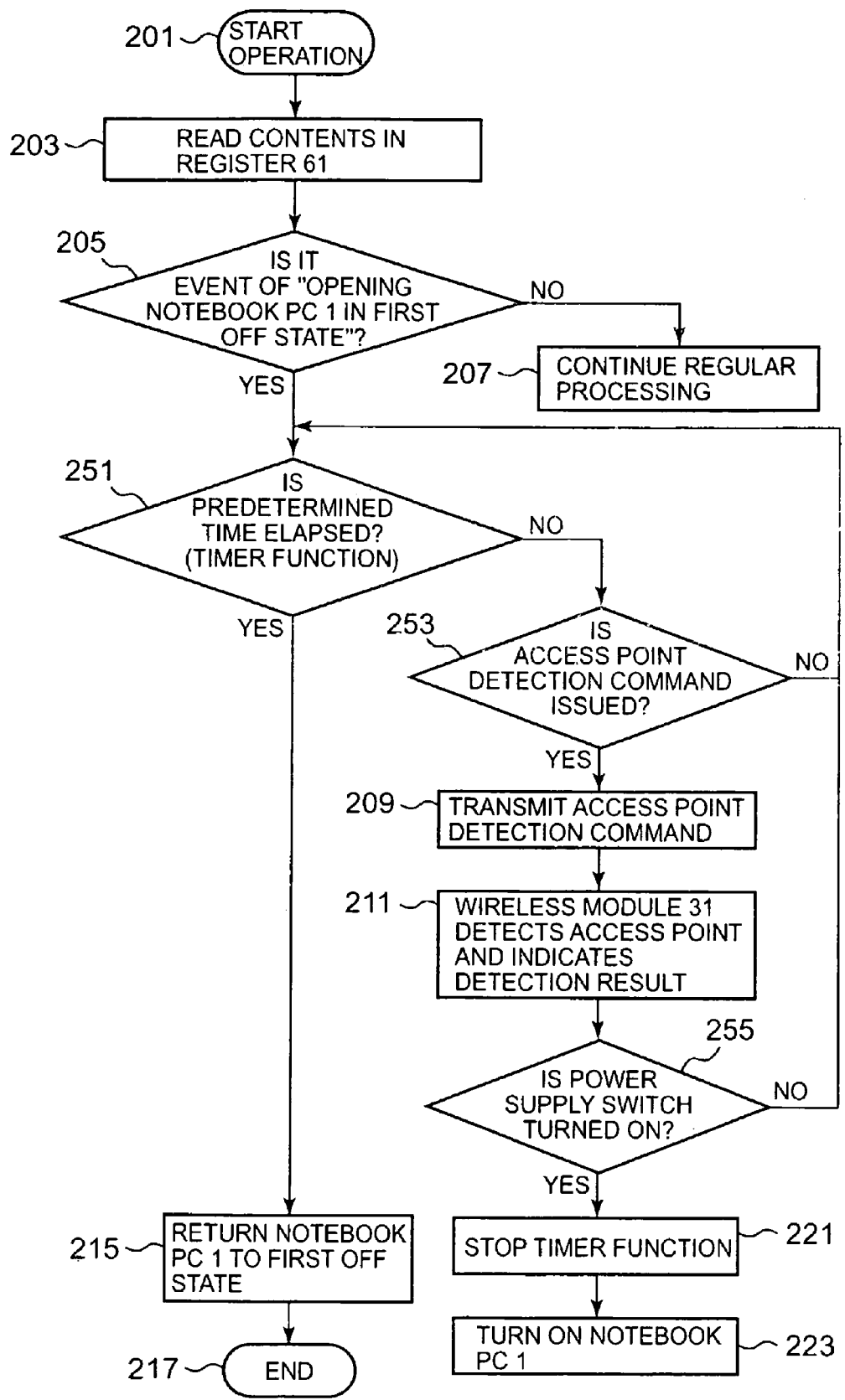
FIG. 8 is a flowchart showing processing executed by an embedded controller in a notebook PC according to an embodiment of the present invention.

FIG. 8 is a flowchart showing processing of a system activation management program executed by the embedded controller 41 in the notebook PC 301. The processing executed here is substantially the same as the processing in the notebook PC 1 depicted in FIG. 6. A difference lies in that, when an event of opening the notebook PC 1 in the first OFF state is recognized in a block 205, a system activation management program uses a timer function to measure elapse of a predetermined time without immediately transmitting an access point detection command to the I/O bridge 25 (at block 251). Here, a longer waiting time than that in the block 213 is set. Since the power is supplied to the second power system during this waiting time, the I/O controller 43 connected to this system also receives the power. Then, the I/O controller 43 waits for input from an input section 15 (at block 253). When a specific hot key or a function key is pressed in the input section 15, the I/O controller 43 can recognize this input as the access point detection command from a user.

When the access point detection command is issued, the control advances to processing concerning detection of an access point in blocks 209 to 211 and waits for a power supply switch to be turned on by the user (at block 225). When the access point detection command is not issued, measurement of the elapsed time is continued in block 251. When the predetermined time has elapsed in block 251, the control advances to processing at block 215 and subsequent blocks. Other processing is the same as that explained in the flowchart of FIG. 6, and hence the same reference numeral will be given, and an explanation thereof is omitted. When this structure is adopted, the notebook PC 301 can be used without emitting electric waves even in a place where utilization of wireless communication is prohibited or undesirable. When the function in the block 253 is disabled, the same detection of an access point as that in the notebook PC 1 can be carried out in other places. It is to be noted that the timer function in the block 251 stops when an access point is detected and a user turns on the notebook PC 1 upon confirming this detection.

Two embodiments have been explained above. In both the embodiments, when the wireless module 31 includes the access point detecting function, an access point is detected in the second OFF state without turning on the notebook PCs 1 and 301, and the notebook PCs 1 and 301 return to the first OFF state by the timer after detection. Therefore, time and power are not wastefully consumed. Additionally, the power supply segments are slightly changed without adding a new device, and a connection target of a part of devices is changed. For example, the lid sensor 47 which is often connected with the embedded controller 41 is connected to the power controller 45. Then, changing contents of processing executed by the power controller 45 and the embedded controller 41 enables carrying out the embodiments. A new button does not have to be provided to cases of the notebook PCs 1 and 301. Further, since an access point is detected in a state where the notebook PCs 1 and 301 are opened, i.e., where a user actually uses the notebook PCs and a sensitivity of the built-in antenna is high, the access point can be more accurately detected.

In each embodiment, although an access point detection result is indicated by lighting the LED 35, the detection result can be indicated by any other method, e.g., producing a beeping sound. However, one of purposes of the present invention is to detect an access point while saving a power consumption, indicating a detection result by a method with a reduced power consumption is desirable. Further, when the wireless module can supply the power in the second OFF state, it does not have to be built in the notebook PC. For example, a PC card conforming to, e.g., a PCMCIA or CardBus standard can be used. Moreover, a structure using a mechanical switch in place of the lid sensor 47 can be considered. The mechanical switch operates without supply of the power, and the permanent magnet 49 is not required.

It is to be noted that the specific illustrated embodiments have been explained in the present invention, but the present invention is not restricted to the foregoing illustrated and described embodiments, and it should be readily understood that any known structure can be adopted as long as the effect of the present invention can be demonstrated. Thus, the present invention has been described while referring to the specific embodiments illustrated in the drawings. However, the present invention is not limited to these embodiments, and of course, so long as the effects provided by the present invention are obtained, any kind of well known configuration can be employed.

It is to be understood that the present invention, in accordance with at least one presently preferred embodiment, includes elements that may be implemented on at least one general purpose computer running suitable software programs. These may also be implemented on at least one integrated circuit or part of at least one integrated circuit. Thus, it is to be understood that the invention may be implemented in hardware, software, or a combination of both.

If not otherwise stated herein, it is to be assumed that all patents, applications, patent publications and other publications (including web-based publications) mentioned and cited herein are hereby fully incorporated by reference as if fully set forth in their entirety herein.

What is claimed is:

1. An apparatus comprising:
a wireless module useable with a wireless device, wherein the wireless module further comprises:
an access point detector which detects a wireless access point through an antenna associated with the wireless device;
a power inlet to which power is supplied from the wireless device responsive to a lid event signal indicating that the antenna is in a most excellent position to sense the wireless access point; and
an indicator output arrangement coupled to said access point detector that outputs a signal to indicate a presence of an available wireless access point.

2. An apparatus comprising:
a wireless module useable with a wireless device, wherein the wireless module further comprises:
an access point detector that detects a wireless access point through an antenna associated with the wireless device;
a power inlet to which power is supplied from the wireless device responsive to a lid event signal indicating that the antenna is in an optimal position to sense the wireless access point; and
an indicator output arrangement coupled to said access point detector that outputs a signal to indicate a presence of an available wireless access point;
a sensor arrangement that detects a lid is opened from a main body, wherein the sensor arrangement produces the lid event signal upon detecting said lid is opened from the main body; and
an indicator arrangement that indicates to a user that a wireless access point has been detected.

3. The apparatus according to claim 2 further comprising a power supply control section that controls a power supply module to:
receive power in a state where the antenna is not in the optimal position; and
to supply power to the wireless module in response to the lid event signal of the sensor.

4. The apparatus according to claim 3 further comprising a timer which starts an operation in response to the lid event signal of the sensor, wherein when the timer reaches a predetermined time, the power supply module stops supply of power to the wireless module.

5. The apparatus according to claim 3, further comprising:
an arrangement that provides a first power supply mode corresponding to a first use state; and
an arrangement that provides a second power supply mode corresponding to a second use state, wherein the second power supply mode has a wider power supply range than the first power supply mode;
wherein the wireless module receives power in the second power supply mode to detect an access point;
wherein the power supply module is switchable between the first power supply mode and the second power supply mode, and further wherein the power supply module is switched from the first power supply mode to the second power supply mode in order to supply power to the wireless module in response to the lid event signal of the sensor.

6. The apparatus according to claim 5, wherein the first use state is a system OFF state in a battery mode.

7. The apparatus according to claim 5, wherein the second use state is a system OFF state in a commercial power supply mode.

8. The apparatus according to claim 5, wherein the power supply range of the second power supply mode is narrower than a power supply range at a time of suspend.

9. The apparatus according to claim 5, further comprising:
a power supply control circuit which receives power in the first power supply mode;
a storage section that stores the lid event signal of the sensor and switches the power supply module from the first power supply mode to the second power supply mode in response to the lid event signal of the sensor.

10. The apparatus according to claim 9, further comprising an event processing circuit that receives power in the second power supply mode, wherein the event processing circuit makes reference to the storage section upon receiving power and reads the lid event signal of the sensor from the storage section and outputs a scan signal to the wireless module that prompts the wireless module to detect the access point.

11. The apparatus according to claim 10, wherein the event processing circuit includes an I/O bridge connected with the wireless module.

12. The apparatus according to claim 10, wherein the event processing circuit includes a timer that starts operation in response to the lid event signal of the sensor, and the event processing circuit outputs to the power supply control circuit a signal for switching the power supply module from the second power supply mode to the first power supply mode when the timer reaches a predetermined time.

13. The apparatus according to claim 10, further comprising:
a user interface controller coupled to a user interface, wherein the event processing circuit outputs the scan signal to the wireless module in response to a user input.

14. The apparatus according to claim 2 wherein when the antenna is not in the optimal position, the apparatus operates in a battery mode and is in a system OFF state.

15. A method comprising:
outputting a lid event signal from a sensor indicating an optimal position for an antenna to sense a wireless access point;
supplying power to a wireless module in response to the lid event signal;
detecting an access point by the wireless module receiving the power in response to the lid event signal; and
stopping supply of power to the wireless module if no access point is detected.

16. The method according to claim 15, wherein the step of stopping supply of power further comprises operating in a battery mode and entering a system OFF state.

17. The method according to claim 15 further comprising:
measuring elapse of a predetermined time after of the lid event signal; and
stopping supply of power to the wireless module in response to elapse of a predetermined time.

18. A program storage device readable by machine, tangibly embodying a program of instructions executable by the machine to perform steps comprising:
outputting a lid event signal from a sensor indicating an optimal position for an antenna to sense a wireless access point;
supplying power to a wireless module in response to the lid event signal;
detecting an access point by the wireless module receiving the power in response to the lid event signal; and
stopping supply of power to the wireless module if no access point is detected.

* * * * *